United States Patent [19]

Lynch

[11] 4,220,314
[45] Sep. 2, 1980

[54] BUTTERFLY VALVE STRUCTURE

[75] Inventor: C. Thomas Lynch, Berkeley, Calif.

[73] Assignee: Axel Johnson Corporation, San Francisco, Calif.

[21] Appl. No.: 25,128

[22] Filed: Mar. 29, 1979

[51] Int. Cl.³ .............................................. F16K 1/228
[52] U.S. Cl. ..................................... 251/307; 251/170
[58] Field of Search ............... 251/307, 159, 161, 163, 251/164, 170, 188

[56] References Cited

U.S. PATENT DOCUMENTS

| 2,749,083 | 6/1956 | Fennema et al. | 251/167 |
| 3,144,040 | 8/1964 | White | 251/307 |
| 3,260,496 | 7/1966 | Borcherdt | 251/307 |
| 3,583,670 | 6/1971 | Manske | 251/307 |
| 3,744,753 | 7/1973 | Clow, Jr. et al. | 251/307 |
| 3,790,131 | 2/1974 | Hagar | 251/306 |
| 3,814,380 | 6/1974 | Kormos et al. | 251/307 |
| 4,006,883 | 2/1977 | Hilsheimer | 251/307 |

FOREIGN PATENT DOCUMENTS 2524895 12/1975 Fed. Rep. of Germany .......... 251/307

Primary Examiner—William R. Cline
Assistant Examiner—H. Jay Spiegel
Attorney, Agent, or Firm—Townsend and Townsend

[57] ABSTRACT

A butterfly valve construction for use particularly on pipelines through which fluid under pressure is adapted to flow and to be selectively cut off. The butterfly valve disc is rotatably supported within the valve casing. Within the valve casing at a region whereat the valve disc is adapted to be turned for closing an elastomeric ring is supported and a plurality of clamp ring segments are supported about the casing periphery to abut one face of the elastomeric ring. Each clamp segment is adjustable to a fixed selective position by positively acting means to compress the elastomeric ring against an internal surface of the disc, thereby also extending the ring in a direction toward the valve disc edge when the latter is in a closed position. This extension is adequate to force the elastomeric ring to fit tightly to the valve ring at valve closing times and directly form a tight seal thereto.

4 Claims, 4 Drawing Figures

U.S. Patent   Sep. 2, 1980   4,220,314
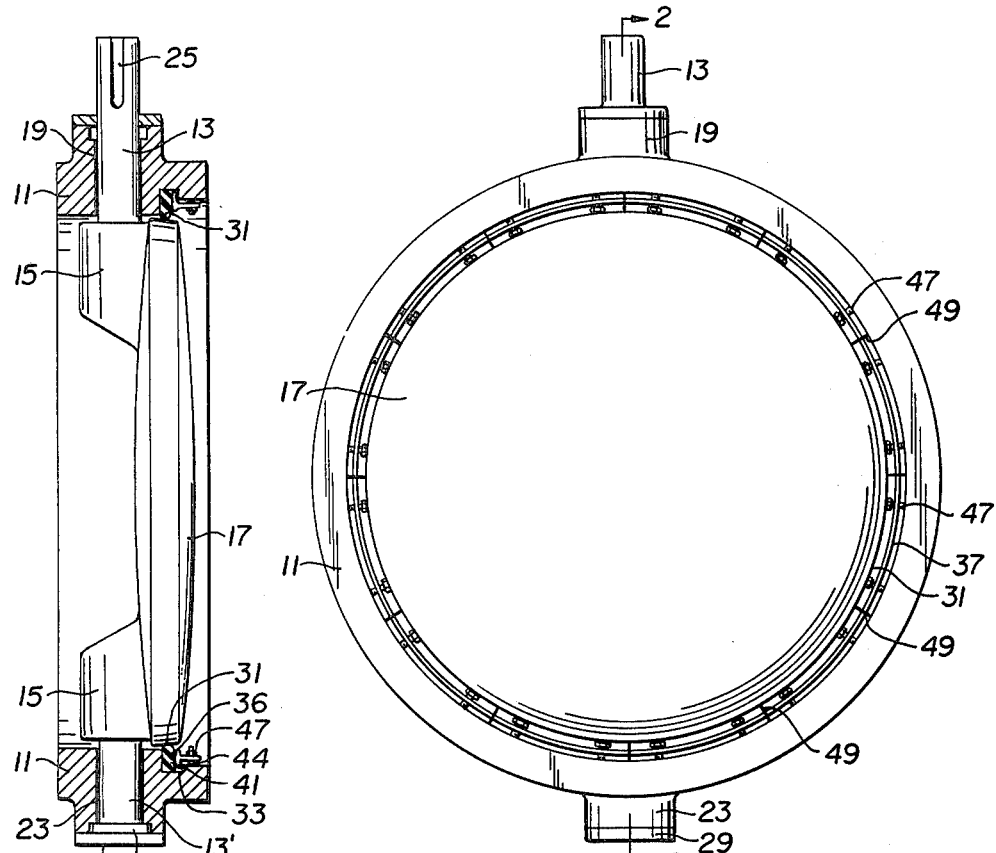
FIG._2.   FIG._1.
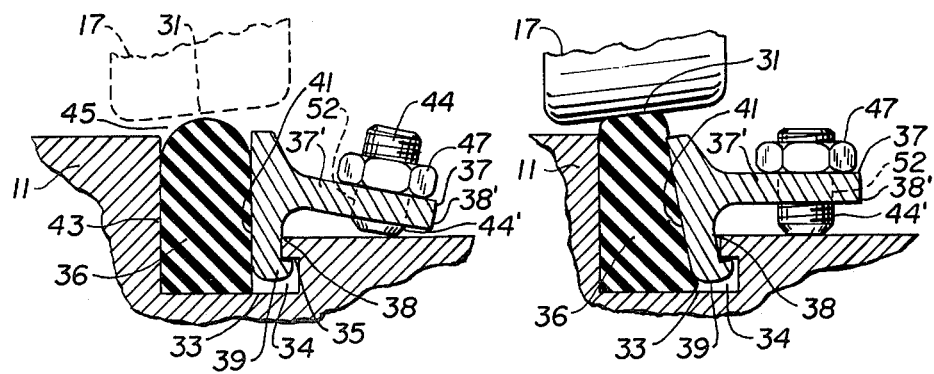
FIG._3.   FIG._4.

BUTTERFLY VALVE STRUCTURE

This invention relates to a sealing member and, in particular, to a butterfly valve for sealing in pipeline systems to preclude passage of fluid, such as liquids or gas, therethrough upon valve closure.

Butterfly valves have been known and used in pipelines for many years. This structure originally involved a valve casing in which an lenticular valve disc member was positioned and journaled upon a pair of rotatable shaft members that were adapted to be turned within the pipeline casing through a limited angle (usually 90°). In the closed position the valve disc was adapted to be turned completely transverse to the fluid flow path in the line, finally to rest upon a ring-like member within the valve member. Valves of this type are usually used in pipelines in which fluid under reasonably high pressure is to be passed. Accordingly, it is important that such a valve type in its closed position shall provide a fluid-tight seal in the pipeline whenever the valve is moved to its closed position, which position is one where the valve disc is moved transversely or normal to the path of fluid flow.

The valve casing or chamber and the butterfly valve disc are both frequently formed of a metal which is reasonably wear-resistant to pressure and to the majority of foreign contaminating objects frequently found in the line. In one of the earliest forms of this type structure it was usual to depend upon a metal-to-metal seal between the butterfly valve disc and the usual ring-like sealing surface within the valve casing with which engagement was to be established in the closed valve disc position. This structure, however, exhibited many significant limitations in the case of both gaseous and liquid flow because of the likelihood of severe abrasion of the metal surfaces with contact and due to the presence of many contaminants frequently present, particularly in the liquids to be passed.

The art then turned to sealing arrangements whereby a resilient or elastomeric seal was established between the internal casing wall structure and the rotatable valve disc whenever such disc was moved from an open to a closed state. Seals of such character were usually established by providing a structure which would support a resilient member, such as rubber or various elastomeric forms, between the casing and the rotatable disc member. This development offered substantially greater drop tightness and considerably greater valve life with consequent cost reduction in the construction.

Various forms of such construction are now known. These include a round nosed rubber seal which is faced between the rotatable valve disc structure and the casing wall. Such a rubber element is so supported that it can, if desired, be compressed in one direction and then expanded in the other direction to regulate the type of fit, but it lacks the possibility of any great degree of adjustment. In another form, a so-called inflatable hose which could be expanded between the casing and the rotatable valve disc under pressure induced therein by activation from any external pressure producing source has been used with some success but since it requires considerable auxiliary equipment, it is generally not acceptable. Another form of the so-called solid section type seal which is more or less a combination of the two forms above mentioned has also been used to some extent where the designers generally combine the forms discussed and the pressure is applied in two forms, but, here also, there has not been fully satisfactory operation.

In the patented art one finds U.S. Pat. No. 3,144,040 to White suggesting a pressure ring structure which can be suitably expanded to bear against the wall of the valve to establish the closure desired. U.S. Pat. No. 3,744,753 to Cloro, Jr. et al. shows a valve disc and a ring deforming ring disc with the ring being capable of radial expansion to permit the adjustment of the valve seal. In U.S. Pat. No. 3,583,670 to Manshe a generally related form of structure is also shown where a sealing ring can also be moved to bear against the edge of the rotatable disc member. U.S. Pat. No. 3,790,131 to Hagar shows a structure wherein the valve disc is adapted to close upon a sealing ring of resilient character which can be suitably altered in shape under pressure to determine the contact with the valve disc.

None of the foregoing devices has proved fully satisfactory and each is somewhat expensive to manufacture and use.

The present invention provides a greatly improved structure by which an adjustable squeezing or compressing device is arranged to distort the shape of an elastomeric member which is held within a stationary body. An elastomeric member of this type is arranged within the valve casing to contact the edge of a rotatable valve disc from the region of the casing wall and at approximately the plane where the rotable valve disc is located when moved to a closure plane position where it is normal to the flow path in the pipeline. A controlled pressure is applied upon the elastomeric sealing member in the valve closing position to place this member in a position where it will tightly contact the valve disc wall periphery to control and establish the tight seal to fully interrupt any fluid flow beyond the disc plane and through the pipeline.

With the foregoing features providing greatly improved operation of a valve structure in which the various working parts can be readily replaced and inexpensively manufactured, a principal object of the invention becomes that of providing a fluid-tight sealing structure which, for simplicity of operation, is effective when the valve disc is carried from its open position to one of closure. Other objects are those of providing a butterfly valve structure in which the working parts, and particularly the sealing ring and its control, can readily be replaced when necessary, after periods of use without dismantling the entire valve structure.

Still other objects are those of developing a butterfly valve structure readily adaptable for use on valves of many different sizes which will function with high efficiency at all reasonable pressures between a minimum and some precalculated maximum, with the efficiency being substantially independent of the valve size.

Another object of the invention is to provide a valve structure in which the various component parts may be manufactured much cheaper than in the case of those now generally in common use, and still provide high efficiency, as well as a valve easy to assemble and dismantle.

Still other objects and advantages will become evident from a consideration of the description of a preferred embodiment of the invention which follows and also in connection with the appended claims when all are considered with the various figures of the accompanying drawings.

In the drawings showing a preferred embodiment of the invention,

FIG. 1 shows a front view considered from the direction of fluid flowing;

FIG. 2 is a partial sectional view on the line 2—2 of FIG. 1;

FIG. 3 is an enlarged sectional view of the valve sealing mechanism of this invention prior to the deformation of the elastomeric sealing member of the valve which provides a control of sealing; and FIG. 4 shows a sectional view generally similar to FIG. 3 but modified to show the segmental clamping ring pivoted against the elastomeric member to squeeze and compress, as well as distort, it so that with any movement of the valve disc to a valve closure position there will be a firm seal established between the valve disc and the sealing ring.

As schematically illustrated by the drawing, there is a main valve body or casing 11 within which the valve mechanism is supported. This body or casing 11 usually constitutes part of a hollow pipeline flow passage for conveying various fluids under pressure therethrough. While not illustrated, it will be understood that the small section of this casing or body member has appropriate connecting means, all well known in the art, to connect it at an appropriate position between an upstream inlet and a downstream outlet point of a fluid transmitting pipeline system.

At two diametrically opposite positions in the casing wall the ends of two stub shafts 13 and 13' are supported. These stub shafts at their ends are secured to the edge of a ring member 15. Each stub shaft 13 and 13' is held in a suitable bearing or bushing member 19 or 19'. The ring member 15 is firmly secured at two opposite stub points to a butterfly valve disc member 17 which is offset from the stub shaft axes. Each such stub shaft is held in a position to be readily rotated upon application of an external control force and with any stub shaft rotation the attached valve disc 17 is also turned to a selected degree. Bearing member 19 supports the stub shaft 13 and, similarly, but in the form of a thrust bearing, the shaft 13' is held to be turned with any turning of the shaft 13 due to the connection of both to the ring 15. The shaft turning is controlled by an operator (not shown) through the use of a key slot 25 cut in the end of the shaft 13. This slot is used to turn with any turning of any suitable control instrument entered in the slot when used in a well known manner. With twisting or turning of shaft 13 there is also control of the movement of the disc 17 attached to and offset from the ring member 15.

The stub shaft 13' at the opposite end from that which can be turned from the key slot 25 rests, as already stated, in the thrust 23. Also, as can be seen, the outer end 27 of shaft 13' rests against an end plate 29 bearing the thrust 23.

As shown clearly from FIG. 1, the valve disc 17 has an annular edge surface 31 with which a sealing effect is adapted to be formed at times when the disc 17 is turned to an angle of 90° from its open to its closed position to interrupt fluid flow in the pipeline.

There is a peripheral sealing groove or recess 33 formed within the body or casing 11. This recess 33 is slightly undercut, as at 34, into the casing 11. Into this portion of the recess there is an overhanging extension 35. An elastomeric ring member 36 is positioned within the groove 33 to rest in the bottom thereof and against an inwardly projecting flat surface 43 thereof. As shown by FIGS. 3 and 4, the elastomeric member 36 is adapted to be held and at times compressed or squeezed within the recess 33 by means of control originated through a plurality of clamp ring segments 37. These clamp rings, as schematically depicted by FIG. 2, are spaced completely around the casing or body member 11.

The clamp ring segments 37 are formed generally as a somewhat modified bell crank lever which has an inwardly extending arm 37' and a downwardly extending depending extension 38 at its outer end. This extending depending part 38 is adapted to protrude downwardly into recess 33 and terminates in a hooked end 39 which, extends beneath an overhanging extension 35 of recess 33 and is in contact with lower surface of extension 35. The downwardly extending member 38 has a surface 41, to be positioned adjacent to the elastomeric ring 36, and with an application of force or pressure against it through the surface 41, member 36 will be squeezed between the fixed flattened surface 43 and surface 41 in a manner which will now be explained.

The arm 37' of the bell crank lever 37 formed by the clamp ring segments is so positioned that prior to pressing the elastomeric ring 36 so that it can contact the edge surface 31 of the valve disc 17 it is substantially rounded and rested at its outer end 38' upon the upper surface of the casing or body 11 (see FIG. 3). This position moves the depending extension 38 to exert minimal pressure against the elastomeric element 36 and the outer edge is spaced apart from the position where the valve disc edge will be with valve closing, as indicated by the spacing 45.

To provide the tight fit between the elastomeric ring element 36 and the edge 31 of the valve disc 17, the elastomeric member is squeezed or compressed and reshaped, as shown by FIG. 4. Such an operation is achieved by reason of the fact that there is an internally threaded opening 52 provided toward the outer end of the arm 37'. Within the threaded opening there is a screw 44 that terminates in a rounded end 44'. The opposite end of the screw 44 contains a means for turning it, such as an aperture for receiving an allen wrench. Locking nut 47 is provided for a purpose well known to the art. When screw 44 is caused to turn through the threaded opening 52, it is apparent that, since the outer end 44' thereof rests upon the fixed surface 11, and thus cannot advance, it causes the arm 37' either to raise or lower, depending upon the direction in which screw 44 is turned.

When screw 44 is turned in a direction to lift the outer end of the arm 37' away from the surface 11, a pivoting of the bell crank lever occurs, with the instantaneous pivot point for this condition being at the point the hooked end 39 of the depending extension 38 of the lever 37' abuts the lower surface 35 of the overhang 38. Such movement has the effect of rocking the flattened surface 41 to press it tightly against the elastomeric ring member 36 and force the latter also tightly against the flat surface 43 of the recess or groove 33.

The action, as is clearly shown by FIG. 4, squeezes or compresses the elastomeric member 36 between the surfaces 41 and 43 and, at the same time, distorts or forces the member 36 outwardly by distortion into the space 35 which will place its expanded end adjacent to valve disc surface edge 31 when the disc is turned to a closed position or normal to that of fluid flow, as in FIG. 4.

Then, it is apparent that if it is desired to change the elastomeric ring 36, the depending arm 38' is returned to the position shown by FIG. 3. This effect is achieved by turning the screw in the opposite direction to move the outer edge of the arm 37' toward the casing surface 11, as shown by FIG. 3, which will then permit ready replacement of the ring 36, because the ring is no longer under considerable pressure within the recess.

It may be remarked that in the position of the control lever 37' of FIG. 3 the disc 17 and its surface 31 is not usually in the closed position and its plane is parallel to fluid flow in the pipeline. Hence it is only for showing the general relationship of components that the dotted line outline showing of FIG. 3 is adopted.

Likewise, it is clearly apparent that other modifications to provide for raising and lowering the outer end of arm 37' may be used. These, for instance, could include having the screw 44 extend through an opening in the end of arm 37' which not threaded, and in which lock nuts on either side of the arm 37' could be used as a means to apply moving force where the nuts would initially be spaced and one would be fixed in a position above and the other in a position below the arm, one such nut being fixed in a limiting position and the other turned against the surface of arm 37'.

The multisection clamp ring 37 can be seen generally by FIG. 2. In this showing it will be apparent that the relative positioning of the multi-section clamp ring, as separated by the radially extending spacers 49, will be clear. In this FIG. 2, the positioning of the clamp ring 47 is only schematically shown, as is the entire clamp ring unit 37 and its components and the elastomeric ring 36.

Still other modifications may readily be adopted within the spirit and scope of the present teachings and descriptions of the invention as set out by the claims to follow.

Having now described the invention in its preferred form, what is claim is:

1. A butterfly valve construction wherein a rotatable valve disc is supported internally of the valve casing member through which fluid is adapted to flow when the disc is rotated to align its planar surface with the fluid flow direction and in which fluid flow is adapted to be arrested when the disc is rotated to a position transverse to the fluid flow direction, comprising:

a circumferential recess formed internally of the casing wall and extending about the inner periphery thereof, said recess having a circumferential undercut portion extending into the casing wall and having an overhanging extension over a portion of the recess;

an elastomeric ring member located partially within the recess, said member being spaced laterally from the overhanging extension and having one side snug against the side of the recess opposite from the overhang;

a plurality of clamp ring segments disposed along the recess, each said segment including a surface bearing against the side of the ring member opposite from said one side, said bearing surface terminating in a hooked end engaging the undercut, said segments each further including an integral pivot arm extending substantially perpendicularly from the underside of the bearing surface and generally parallel to the casing wall; and a plurality of extension members projecting from the respective pivot arms into contact with the casing wall, each said extension member being independently adjustable to pivot the associated pivot arm about its hooked end and compress the ring member between the side of the recess and the bearing surface of the associated segment to control the tightness of the seal provided by the ring member.

2. The butterfly valve of claim 1 wherein said extension members comprise screws passing through and engaging threaded apertures in the respective pivot arms, said screws being rotatably adjustable to pivot the respective pivot arms.

3. The butterfly valve of claim 1 wherein the clamp ring segments each have a generally "T" shaped cross section, the upper surface of the "T" providing the bearing surface, the vertical portion of the "T" providing the pivot arm, one end of the cross member of the "T" having a depending extension providing the hooked end.

4. A butterfly valve construction wherein a rotatable valve disc is supported internally of the valve casing member through which fluid is adapted to flow when the disc is rotated to align its planar surface with the fluid flow direction and in which fluid flow is adapted to be arrested when the disc is rotated to a position transverse to the fluid flow direction, comprising:

a circumferential recess formed internally of the casing wall and extending about the inner periphery thereof, said recess having a circumferential undercut portion extending into the casing wall and having an overhanging extension over a portion of the recess;

an elastomeric ring member located partially within the recess, said member being spaced laterally from the overhanging extension and having one side snug against the side of the recess opposite from the overhang;

a plurality of clamp ring segments each having a "T" shaped cross section with a depending extension on one end of the cross member of the "T" to provide a hooked end, said segments being distributed along the recess with the hooked end engaging the overhanging extension, the upper surface of the cross member bearing against the ring member and the vertical portion of the "T" extending generally parallel to the casing wall and having a threaded aperture therein; and a plurality of screws passing through and engaging the threaded apertures in the respective clamp ring sections, said screws being rotatably adjustable to pivot the respected clamp ring segments about the overhanging extension of the recess to compress the ring member between the side of the recess and the upper surface of the clamp ring segments to control the tightness of the seal provided by the ring member.

* * * * *